UNITED STATES PATENT OFFICE.

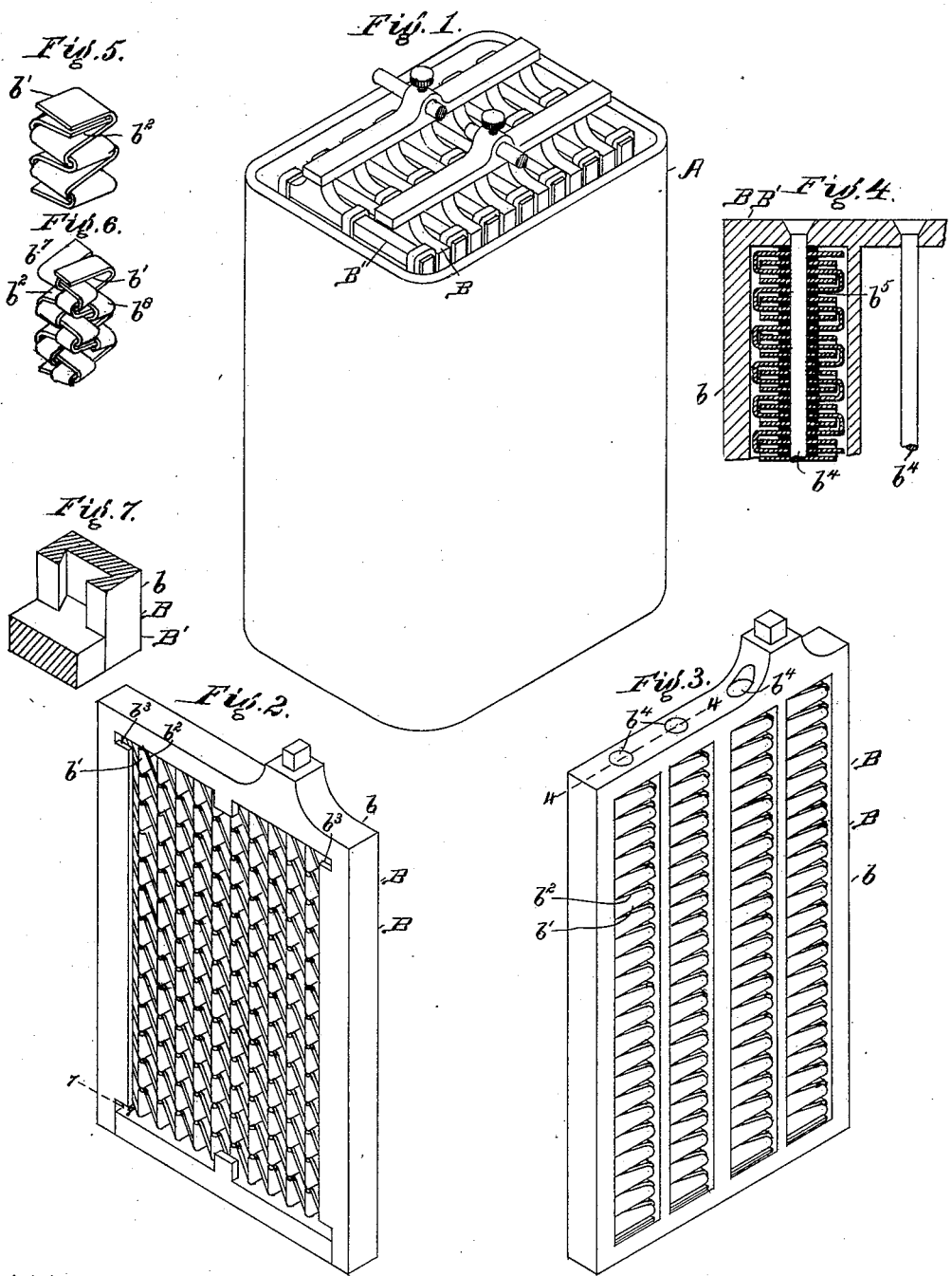

JOSEPH Y. BRADBURY AND FRANK J. STONE, OF LOWELL, MASSACHUSETTS.

ELECTRODE FOR SECONDARY BATTERIES.

SPECIFICATION forming part of Letters Patent No. 415,936, dated November 26, 1889.

Application filed September 13, 1889. Serial No. 323,837. (No model.)

*To all whom it may concern:*

Be it known that we, JOSEPH Y. BRADBURY and FRANK J. STONE, both citizens of the United States, residing at Lowell, in the county of Middlesex and Commonwealth of Massachusetts, have invented a certain new and useful Improvement in Electrodes for Storage-Batteries, of which the following is a specification.

Our invention relates to electrodes for storage or secondary batteries; and it consists, substantially, in a suitable frame and ribbons or strips of sheet-conducting material alternately bent each over the other at about right angles and supported in said frame.

In the accompanying drawings, Figure 1 is an isometric perspective view of a single cell of a storage-battery having electrodes embodying our improvement; Fig. 2, an isometric view of a single electrode embodying our invention; Fig. 3, an isometric view of a single electrode embodying our improvement, showing the different sections of the electrode separated by bars of the frame; Fig. 4, a section on the line 4 4 in Fig. 3 of a part of an electrode; Fig. 5, an isometric view of a part of a section of an electrode such as is shown in Figs. 2 and 3. Fig. 6 is similar to Fig. 5, except that two pairs of ribbons are used, a ribbon of each pair being bent alternately with the other ribbon of the same pair over a ribbon of the other pair; Fig. 7, a section on the line 7 7 in Fig. 2, showing the flanges on the frame by means of which the sections of the electrodes are retained in the frame.

A, Fig. 1, is a cell or containing-vessel for the electrodes B B' and the active material. The electrodes are connected in the usual manner, and are used in the same way as the electrodes of other secondary or storage batteries and for the same purpose and with the same effect. The electrodes B consist of suitable frames $b$, preferably of conducting material, as lead; but the body of the electrode consists of a series of parallel sections, which may be horizontal, as shown in Fig. 2, or vertical, as shown in Figs. 3 and 4.

In each of the figures, except Figs. 6 and 7, each section of the electrode consists of two strips or ribbons $b'$ $b^2$, each ribbon being bent across the other back and forth, as best shown in Fig. 5, the sections so formed being held in the frame $b$ by inwardly-projecting ribs or ridges $b^3$, as shown in Fig. 2, or by rods $b^4$, such as are shown in Figs. 3 and 4, which rods may be of conducting or insulating material, preferably the latter, in order that said rods may be repeatedly used, the rods passing through the sections from end to end thereof through holes formed in said sections and in the frame. When the sections are to stand on end, as shown in Figs. 3 and 4, it is thought best to interpose washers $b^5$ between the successive layers or parallel parts of the conducting-ribbons, as shown in Fig. 4, to prevent the sections shortening by their own weight and bringing their adjacent surfaces into contact, and thus lessening the surface exposed to the action of the active material of the battery.

In Fig. 6 two strips $b'$ $b^2$ $b^7$ $b^8$ are represented as running in each direction and crossing the folds of a strip of the other pair of strips alternately.

By the constructions above described a much larger surface of the conducting support or electrode is exposed to the active material, and the electrodes, whether placed vertically on either edge or horizontally, furnish a large surface and a large number of pockets for the retention of the active material.

If the frame $b$ is of non-conducting material, the different sections of the electrode should be connected to each other by conductors of electricity, as by wires, or by bringing the ends of the strips which form the different sections of the same electrode in contact with each other.

We claim as our invention—

1. An electrode for secondary or storage batteries, consisting of a suitable frame and ribbons or strips of conducting and supporting material alternately bent each over the other at about right angles and supported in said frame, as and for the purpose specified.

2. The combination, in an electrode for storage or secondary batteries, of a supporting-frame and two strips or sets of strips of conducting and supporting material, each of said strips being arranged to cross another of said strips and to be crossed by it alternately, as and for the purpose specified.

3. In an electrode for storage-batteries, the combination of the frame, strips or ribbons of conducting and supporting material, each bent across the other back and forth, as described, washers interposed between the successive layers or parallel parts of said strips or ribbons, and rods passing through said frame, said washers, and said ribbons, substantially as described, for the purpose specified.

In witness whereof we have signed this specification, in the presence of two attesting witnesses, this 6th day of September, A. D. 1889.

JOSEPH Y. BRADBURY.
FRANK J. STONE.

Witnesses:
JOHN I. COGGESHALL,
ALBERT M. MOORE.